(12) United States Patent
Kim et al.

(10) Patent No.: US 11,550,996 B2
(45) Date of Patent: Jan. 10, 2023

(54) METHOD AND SYSTEM FOR DETECTING DUPLICATE DOCUMENT USING VECTOR QUANTIZATION

(71) Applicant: NAVER CORPORATION, Gyeonggi-do (KR)

(72) Inventors: Sung Min Kim, Seongnam-si (KR); Byeonghoon Han, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/120,693

(22) Filed: Dec. 14, 2020

(65) Prior Publication Data

US 2021/0182479 A1 Jun. 17, 2021

(30) Foreign Application Priority Data

Dec. 17, 2019 (KR) .................. 10-2019-0169132

(51) Int. Cl.
*G06F 40/194* (2020.01)
*G06F 40/289* (2020.01)
*G06F 40/30* (2020.01)

(52) U.S. Cl.
CPC .......... *G06F 40/194* (2020.01); *G06F 40/289* (2020.01); *G06F 40/30* (2020.01)

(58) Field of Classification Search
None
See application file for complete search history.

(56) References Cited

U.S. PATENT DOCUMENTS 11,233,761 B1 * 1/2022 Gusev ................. G06N 3/08
2006/0294101 A1 12/2006 Wnek
2011/0055332 A1 * 3/2011 Stein ................... H04L 51/12
709/206

(Continued)

FOREIGN PATENT DOCUMENTS

JP 4919515 B2 4/2012
KR 10-2010-0008466 A 1/2010

(Continued)

OTHER PUBLICATIONS

Zhang, Dell, Jun Wang, Deng Cai, and Jinsong Lu. "Self-taught hashing for fast similarity search." In Proceedings of the 33rd international ACM SIGIR conference on Research and development in information retrieval, pp. 18-25. 2010. (Year: 2010).*

(Continued)

*Primary Examiner* — Frank D Mills
(74) *Attorney, Agent, or Firm* — Harness, Dickey & Pierce, P.L.C.

(57) ABSTRACT

Disclosed is a method and system for detecting a duplicate document using vector quantization. A duplicate document detection method may include acquiring, by processing circuitry, a respective vector expression for each of a plurality of documents using a similarity model, the similarity model being trained to output similar vector expressions for semantically similar documents, generating a key by performing a vector quantization on the respective vector expression, the key including a binary character string, and detecting a duplicate document from among the plurality of documents using the key.

23 Claims, 7 Drawing Sheets

(56) References Cited

U.S. PATENT DOCUMENTS

| | | | | |
|---|---|---|---|---|
| 2011/0087668 A1* | 4/2011 | Thomas | ............... | G06F 16/35 |
| | | | | 707/738 |
| 2012/0323968 A1* | 12/2012 | Yih | ............... | G06F 16/31 |
| | | | | 707/780 |
| 2018/0075138 A1* | 3/2018 | Perram | ............... | G06F 16/93 |

FOREIGN PATENT DOCUMENTS

| | | |
|---|---|---|
| KR | 2019-0043604 A | 4/2019 |
| WO | WO-2006/119578 A1 | 11/2006 |

OTHER PUBLICATIONS

Gao, Jin, Yahao He, Xiaoyan Zhang, and Yamei Xia. "Duplicate short text detection based on Word2vec." In 2017 8th IEEE International Conference on Software Engineering and Service Science (ICSESS), pp. 33-37. IEEE, 2017. (Year: 2017).*

Oghbaie, Marzieh, and Morteza Mohammadi Zanjireh. "Pairwise document similarity measure based on present term set." Journal of Big Data 5, No. 1 (2018): 1-23. (Year: 2018).*

Korean Office Action dated Jun. 11, 2021 by the Korean Patent Office corresponding to Korean patent application No. 10-2019-0169132.

Liu, S. et al.: "Accurate Deep Representation Quantization with Gradient Snapping Layer for Similarity Search" Association for the Advancement of Artificial Intelligence, 2017, pp. 1-7, XP055801305, Retrieved from the Internet: URL: https://arxiv.org/pdf/1610.09645. pdf [retrieved on May 26, 2021].

Yoshihama, S. et al.: "Web-based Data Leakage Prevention"Yokohama National University, 2011, XPO55234468, Retrieved from the Internet: URL: http://citeseerx.ist.psu.edu/viewdoc/download;jsessionid=5AO5OA63CB61A931349DB6FACEE97D9E?doi=10.1.1.207.5902&rep-repl&type=pdf [retrieved on May 26, 2021].

Gao L. et al.: "Learning in High-Dimensional Multimedia Data: The State of the Art", Cornell University Library, 2017, XPO80775509, DOI: 10.1007/SO0530-015-0494-1 [retrieved on May 26, 2021].

Extended European Search Report dated May 17, 2021, corresponding to European Patent Application No. 20214492.9-1213.

Korean Office Action dated Dec. 30, 2021 by the Korean Patent Office corresponding to Korean patent application No. 10-2019-0169132.

* cited by examiner

METHOD AND SYSTEM FOR DETECTING DUPLICATE DOCUMENT USING VECTOR QUANTIZATION

CROSS-REFERENCE TO RELATED APPLICATIONS

This U.S. non-provisional application and claims the benefit of priority under 35 U.S.C. § 119 to Korean Patent Application No. 10-2019-0169132, filed Dec. 17, 2019, the entire contents of which are incorporated herein by reference in their entirety.

TECHNICAL FIELD

At least one example embodiment relates to a method and system for detecting a duplicate document using vector quantization.

RELATED ART

To cluster similar documents in a large document set, conventional devices perform a clustering algorithm such as a k-means clustering, train a model that serves the same role as the clustering algorithm, or perform a hash algorithm using an encryption algorithm such as message-digest algorithm 5 (MD5) for document content. For example, technology exists for removing a double, that is, duplicate webpage, by converting a relative address included in content of an input webpage to an absolute address, by calculating a hash value of an absolute address webpage converted to the absolute address, by determining whether the calculated hash value is present in a hash value list, by adding the hash value to a hash value list when the corresponding hash value is absent, and by storing the collected webpage in a webpage storage.

In the case of directly learning document clustering, a learning time may increase according to an increase in a number of documents. A clustering algorithm, such as a k-means clustering, incurs a computational cost that is proportional to a number of clusters even in the case of performing prediction after learning. Also, in many cases, an encryption algorithm, such as MD5, may allow two documents to have the same key value (hash value) only when the documents have the exactly same content and thus, may not detect a duplicate document if even partial content is different.

SUMMARY

At least one example embodiment provides a method and system for detecting a duplicate document that may quickly determine whether a duplicate part is present between documents based on a vector quantization.

According to an aspect of at least one example embodiment, there is provided a duplicate document detection method of a computer apparatus including processing circuitry, the method including acquiring, by processing circuitry, a respective vector expression for each of a plurality of documents using a similarity model, the similarity model being trained to output similar vector expressions for semantically similar documents, generating a key by performing a vector quantization on the respective vector expression, the key including a binary character string, and detecting a duplicate document from among the plurality of documents using the key.

The vector expression may be in a form of an N dimensional real vector.

Here, N denotes a natural number of 2 or more.

The generating of the key may include generating the binary character string by replacing a value in the respective vector expression of 0 or more with 1, or replacing a negative value in the respective vector expression with 0.

The detecting of the duplicate document may include detecting two among the plurality of documents associated with the key.

The method may include training the similarity model using a loss function adjusted based on a weight, the weight corresponding to a difference between an output value of the similarity model and a calculated value.

The method may include adjusting an average distance between a plurality of vector expressions by adjusting a value of the weight, the plurality of vector expressions including the respective vector expression.

The duplicate document detection method may further include extracting, by the processing circuitry, a similar document pair set and a dissimilar document pair set from a document database, the similar document pair set including a plurality of similar document pairs having a common attribute, and the dissimilar document pair set including a plurality of dissimilar document pairs extracted randomly, calculating, by the processing circuitry, a mathematical similarity for each of the plurality of similar document pairs and each of the plurality of dissimilar document pairs using a mathematical measure to obtain a first plurality of mathematical similarities based on the plurality of the similar document pairs and a second plurality of mathematical similarities based on the plurality of dissimilar document pairs, calculating, by the processing circuitry, a semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities, and training, by the processing circuitry, the similarity model based on the plurality of similar document pairs, the plurality of dissimilar document pairs, the first plurality of semantic similarities and the second plurality of semantic similarities to obtain a trained similarity model.

The common attribute may include at least one of an author of a document, a post section of the document, or a registration time range of the document.

The calculating of the semantic similarity may include calculating the first plurality of semantic similarities by inputting the first plurality of mathematical similarities to a first nonlinear function, and calculating the second plurality of semantic similarities by inputting the second plurality of mathematical similarities to a second nonlinear function, and the first nonlinear function outputs a value greater than a value output by the second nonlinear function based on any value input to both the first nonlinear function and the second nonlinear function.

According to an aspect of at least one example embodiment, there is provided a non-transitory computer-readable record medium storing instructions that, when executed by processing circuitry, cause the processing circuitry to perform the method.

According to an aspect of at least one example embodiment, there is provided a computer apparatus including processing circuitry. The processing circuitry is configured to cause the computer apparatus to acquire a respective vector expression for each of a plurality of documents using a similarity model, the similarity model being trained to output similar vector expressions for semantically similar documents, generate a key by performing a vector quantization on the respective vector expression, the key including a binary character string, and detect a duplicate document from among the plurality of documents using the key.

According to at least one example embodiment, it is possible to quickly determine whether a duplicate part is present between documents based on a vector quantization.

According to at least one example embodiment, instead of training a model to directly perform clustering, the model is trained to acquire a vector expression for each document through a similarity learning for document pairs and then acquires a hash value for each of the documents through a vector quantization. Therefore, it is possible to save or reduce computational cost.

According to at least one example embodiment, since it is possible to acquire the same key value, or similar key values, for similar documents in a wider range than an encryption algorithm, such as message-digest algorithm 5 (MD5), whether a duplicate part is present may be determined even with respect to documents having partially different content.

Further areas of applicability will become apparent from the description provided herein. The description and specific examples in this summary are intended for purposes of illustration only and are not intended to limit the scope of the present disclosure.

DETAILED DESCRIPTION

Figure 1:
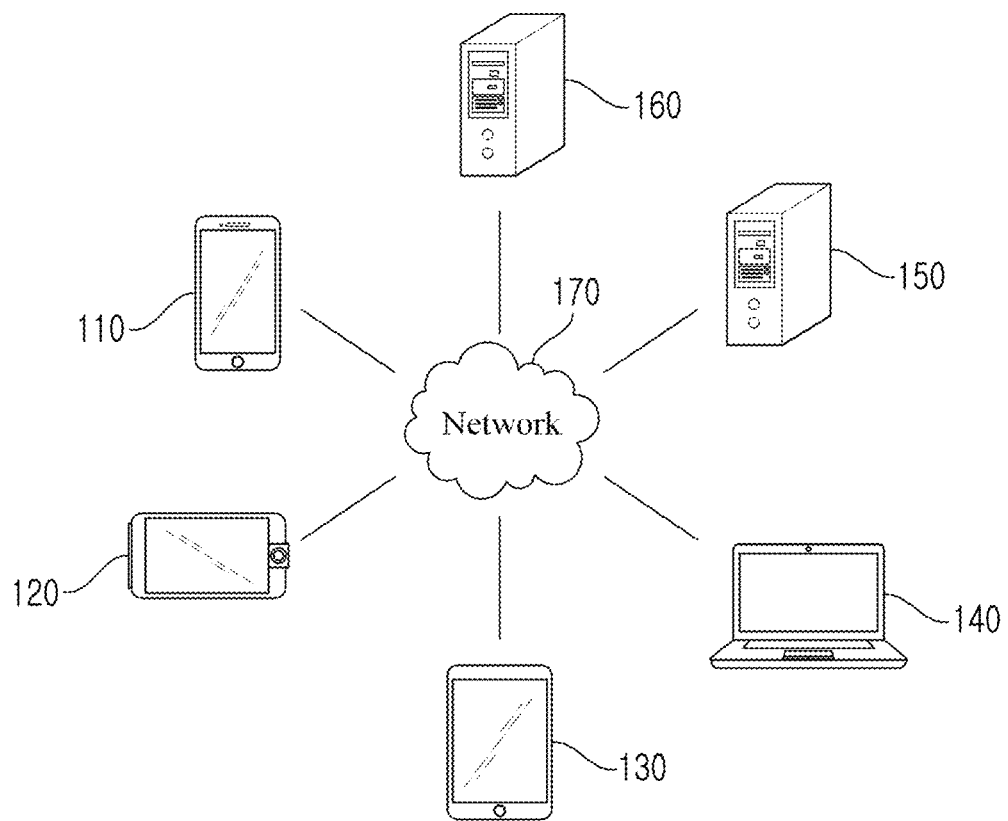
FIG. 1 is a diagram illustrating an example of a network environment according to at least one example embodiment.

At least one example embodiment will be described in detail with reference to the accompanying drawings. At least one example embodiment, however, may be embodied in various different forms, and should not be construed as being limited to only the illustrated examples. Rather, the illustrated examples are provided that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

A duplicate document detection system according to at least one example embodiment may be implemented by at least one computer apparatus, and a duplicate document detection method according to at least one example embodiment may be performed through at least one computer apparatus included in the duplicate document detection system. Here, a computer program according to at least one example embodiment may be installed and executed on the computer apparatus and the computer apparatus may perform the duplicate document detection method under control of the executed computer program. The computer program may be stored in a non-transitory computer-readable record medium to implement the duplicate document detection method on a computer in conjunction with the computer apparatus.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto. Also, the network environment of FIG. 1 is provided as an example only among environments applicable to at least one example embodiment. An environment applicable to at least one example embodiment is not limited to the network environment of FIG. 1.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and/or 140, and/or the servers 150 and 160 over the network 170 in a wireless and/or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a service to the plurality of electronic devices 110, 120, 130, and/or 140 connected over the network 170. Here, the service may include, for example, a content providing service, a group call service or an audio conferencing service, a messaging service, a mail service, a social network service (SNS), a map service, a translation service, a financial service, a payment service, and/or a search service.

Figure 2:
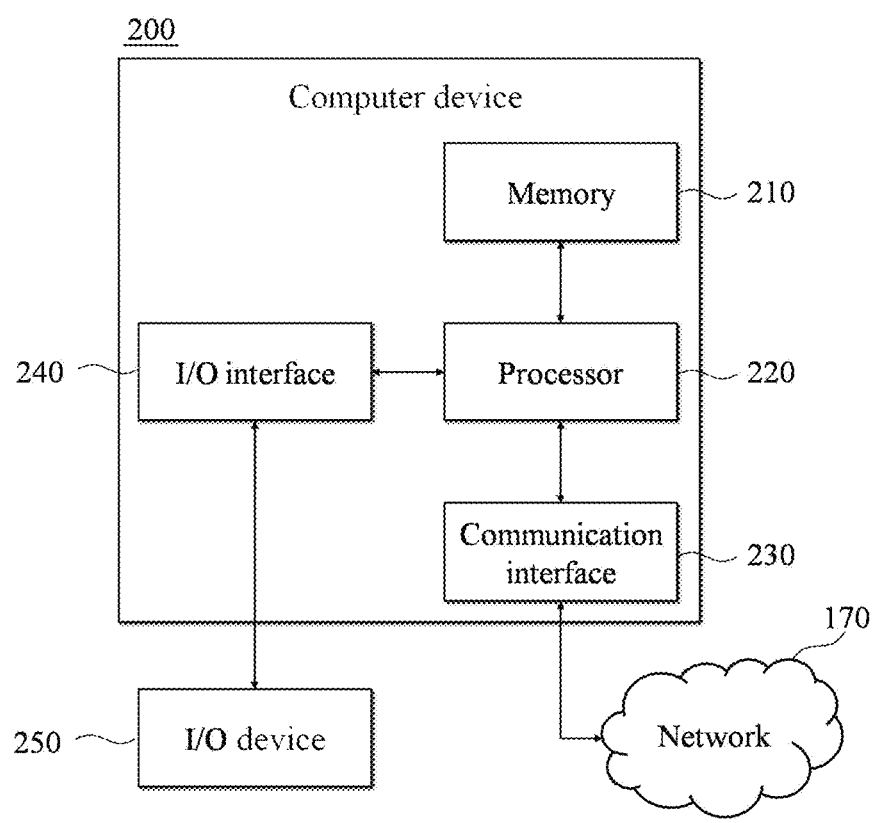
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and/or 140, and/or each of the servers 150 and/or 160, may be implemented by a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable storage medium. The permanent mass storage device, such as the ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include, for example, a floppy drive, a disk, a tape, a DVD/CD-ROM drive, a memory card, etc. According to at least one example embodiment, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Inversely, a signal, an instruction, data, a file, etc., from the other apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250 (e.g., an input device and/or an output device). For example, an input device may include a device, such as a microphone, a keyboard, a mouse, and the like, and an output device may include a device, such as a display, a speaker, and the like. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to at least one example embodiment, the computer apparatus 200 may include a number of components greater than or less than a number of components shown in FIG. 2. However, some conventional components are not illustrated in detail. For example, the computer apparatus 200 may be configured to include at least a portion of the I/O apparatus 250 or may further include other components, such as, a transceiver and a database.

The term "document" used herein may include a post uploaded on a web (e.g., the Internet) by any author, such as, for example, a blog listing, a news article, and/or a comment. Also, the term "attribute" refers to a predefined or alternatively, given feature and may be determined based on (e.g., may include) at least one of an author of a document, a post section of the document, and/or a registration time range of the document. Here, the post section of the document may be based on sections on which documents are displayed at a single service. For example, that post sections of two documents are identical or similar may represent that the two posts are posted on the same post section, or similar post sections, among a plurality of post sections on which documents are displayed at a single service. For example, as sections for posting a document to a specific blog, a posting section for "movie", a posting section for "music", and a posting section for "book" may be included. The posting sections of documents may be variously set for each service to which the document is posted. When an author is defined as an attribute, two different blog listings of the same author, or similar authors, may be recognized as documents of the same attributes or similar attributes. As another example, when an author, a post section, and a 1-hour range are defined as attributes, two comments registered on the same post section, or similar post sections, by the same author, or similar authors, within 1 hour may be recognized as documents of the same attributes or similar attributes. Also, the term "duplicate" between documents used herein may represent that two documents have a similarity greater than or equal to a threshold. For example, with the assumption that a value of a similarity between documents is represented as the range of 0.00 to 1.00 and a threshold for "duplicate" is 0.95, if a value of a similarity between a document 1 and a document 2 is 0.97, the document 1 and the document 2 may be determined to be duplicate documents. That is, although contents of two documents do not completely match, documents including a certain or more similar contents (e.g., a certain amount of similar content or more) may be determined as duplicate documents.

Figure 3:
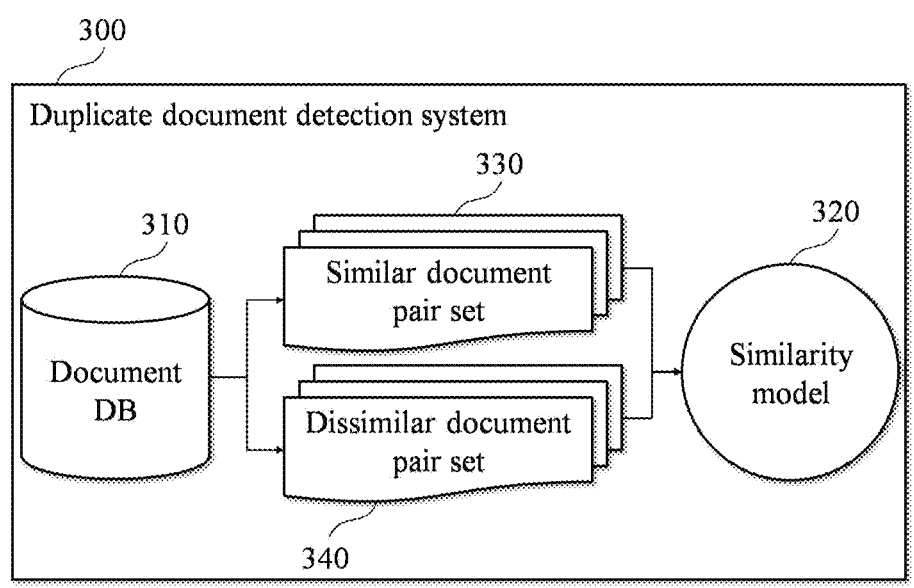
FIG. 3 illustrates an example of a process of training a similarity model according to at least one example embodiment.

FIG. 3 illustrates an example of a process of training a similarity model according to at least one example embodiment. A duplicate document detection system 300 may be implemented by the aforementioned computer apparatus 200 and may process the following similarity model training process under control of the processor 220 included in the computer apparatus 200.

The duplicate document detection system 300 may determine whether a duplicate part is present between documents included in a document database (DB) 310. To this end, the duplicate document detection system 300 may train a similarity model 320.

The document DB 310 may be included in a physical apparatus (a first apparatus, e.g., the server 150) that implements the duplicate document detection system 300 and configured to provide documents. Also, the document DB 310 may be configured in another physical apparatus (a second apparatus, e.g., the server 160) outside the duplicate document detection system 300 and configured to provide documents in a form that the first apparatus and the second apparatus communicate with each other through the network 170.

The duplicate document detection system 300 may extract a similar document pair set 330 and a dissimilar document pair set 340 from the document DB 310. Here, the similar document pair set 330 denotes a set of document pairs each of which having a same or similar predefined or alternatively, given attribute (e.g., an attribute common to the pair and/or set of documents and having the same or similar values in the pair and/or set of documents, may also be referred to herein as a common attribute) and the dissimilar document pair set 340 denotes a set of document pairs randomly extracted (e.g., randomly paired) without considering an attribute. Depending on at least one example embodiment, the dissimilar document pair set 340 denotes a set of document pairs each of which having a different predefined or alternatively, given attribute (e.g., an attribute common to the pair and/or set of documents that has different values in the set of documents).

In one experiment example, 35 million "document pairs created within 1 hour in the same post section by the same author," which is a document pair of a predefined or alternatively, given attribute, were extracted from among 140 million comments as the similar document pair set 330 and 35 million document pairs each including any two comments were extracted from among 140 million comments as the dissimilar document pair set 340. Here, hypothesis 1 is that, as a number of extractions of two comments infinitely increases, a semantic similarity probability a between two comments of the same attribute, or similar attributes, is greater than a semantic similarity probability 13 between randomly extracted two comments. Hypothesis 2 is that, with the assumption that a value of a similarity (hereinafter, a mathematical similarity) using a mathematical measure is identical or similar, a mathematical similarity between two comments of the same attribute, or a similar attribute, is likely to be underestimated by the mathematical measure and a mathematical similarity between randomly extracted two comments is likely to be overestimated by the mathematical measure. For example, the proportion of cases in which a semantic/subjective similarity is present between two comments of the same attribute, or similar attributes, having the mathematical similarity of 0.2 or less was high. Conversely, the proportion of cases in which a semantic/subjective similarity is absent between arbitrarily extracted two comments of which the mathematical similarity is 0.7 or more was high.

Based on the above verified hypotheses, the duplicate document detection system 300 according to at least one example embodiment may calculate a mathematical similarity using a mathematical measure for each of the similar document pairs of the similar document pair set 330 and each of the dissimilar document pairs of the dissimilar document pair set 340. Here, the duplicate document detection system 300 may determine a semantic similarity for each of document pairs by increasing or decreasing the calculated mathematical similarity depending on whether an attribute is identical or similar. For example, a mathematical similarity calculated for each of the similar document pairs of the similar document pair set 330 may be regarded as (e.g., may be considered as indicating) that a value of the mathematical similarity is underestimated, and a semantic similarity may be calculated by appropriately increasing a value of the calculated mathematical similarity. Conversely, a mathematical similarity calculated for each of the dissimilar document pairs of the dissimilar document pair set 340 may be regarded as (e.g., may be considered as indicating) that a value of the mathematical similarity is overestimated, and a semantic similarity may be calculated by appropriately decreasing a value of the calculated mathematical similarity.

In detail, for example, the duplicate document detection system 300 may increase a value of a mathematical similarity of a similar document pair by inputting the value of the mathematical similarity of the similar document pair to a first nonlinear function, and may decrease a value of a mathematical similarity of a dissimilar document pair by inputting the value of the mathematical similarity of the dissimilar document pair to a second nonlinear function. The first nonlinear function may increase a value of an underestimated mathematical similarity with respect to a similar document pair, and the second nonlinear function may decrease a value of an overestimated mathematical similarity with respect to a dissimilar document pair. In the case of two nonlinear functions meeting a condition in which the first nonlinear function calculates a value greater than that of the second nonlinear function with respect to all of the same input values or similar input values, the two nonlinear functions may be used as the first nonlinear function and the second nonlinear function (e.g., the first nonlinear function may output a value greater than a value output by the second nonlinear function based on any value input to both the first nonlinear function and the second nonlinear function).

A semantic similarity calculated for document pairs (e.g., using the first nonlinear function and the second nonlinear function) may be regarded as a correct answer score for the similarity model 320. For example, the duplicate document detection system 300 may train the similarity model 320 using the similar document pair set 330, the dissimilar document pair set 340, and the correct answer score as learning data. For example, the similarity model 320 may be trained to calculate a semantic similarity for an input document pair.

In detail, for example, the similarity model 320 may be trained such that an output value for input document pairs (e.g., a semantic similarity determined using the similarity model 320) may minimize a mean squared error (MSE), or represent a lowest MSE, with the correct answer score (e.g., the calculated semantic similarity). For example, the similarity model 320 may be trained to minimize or lower a loss by inputting the output value and the correct answer score to a loss function using the MSE. At least one of known deep learning models may be used as the similarity model 320. For example, a convolutional neural network (CNN) or a recurrent neural network (RNN) may be used to implement the similarity model 320. In this case, the similarity model 320 may be configured to receive a document pair and to output a real number (a semantic similarity) in the range of 0 to 1. The range of an output value is provided as an example only and is not limited to the range of 0 to 1. In at least one example embodiment, the duplicate document detection system 300 may perform some operations (e.g., the operations described herein as being performed training, using and/or implementing the similarity model 320) by artificial intelligence and/or machine learning. As an example, the duplicate document detection system 300 may implement an artificial neural network (e.g., the similarity model 320) that is trained on a set of training data by, for example, a supervised, unsupervised, and/or reinforcement learning model, and wherein the duplicate document detection system 300 may process a feature vector to provide output based upon the training. Such artificial neural networks may utilize a variety of artificial neural network organizational and processing models, such as CNNs, RNNs optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the duplicate document detection system 300 may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The trained similarity model 320 may be used (e.g., by the duplicate document detection system 300) to detect a duplicate between documents. For example, if a plurality of comments is registered and, in this state, an author requests registration of a new comment, the duplicate document detection system 300 may detect comments that duplicate the new comment. Here, if N or more duplicate comments are detected, the duplicate document detection system 300 may prevent or reduce indiscriminate registration of a new duplicate comment by displaying Completely Automated Public Turing test to tell Computers and Humans Apart (CAPTCHA). According to at least one example embodiment, the duplicate document detection system 300 may block registration of a new document and/or display the CAPTCHA in response to detecting that the new document is a duplicate document. Blocking registration of the new document may include preventing or reducing display of the new document. According to at least one example embodiment, the duplicate document detection system 300 may register and/or display the new document in response to detecting that the new document is not a duplicate document. For example, a system providing a social media service may include the duplicate document detection system 300. In this case, the system providing the social media service may detect and prevent duplicate documents or duplicate comments posted on the social media service in real time by using the duplicate document detection system 300.

According to at least one example embodiment, the similarity model 320 may be trained to perform similarity learning and/or to output an appropriate vector expression for each document instead of, or in addition to, the aforementioned semantic similarity. For example, a model configured to measure a document similarity based on deep learning may acquire a vector expression before quantization, and may calculate a final similarity based on a distance between two vector expressions in a process of outputting a similarity. Therefore, in the case of considering a similarity calculation process as a function, the similarity may be a dependent variable and the two vector expressions may be independent variables. Therefore, to adjust the dependent variable to be a desired value, the two vector expressions that are independent variables may be adjusted and thus, a process of learning a similarity may be regarded as being identical or similar to a process of acquiring an appropriate vector expression for each document. Therefore, in the following discussion, the similarity model 320 may be trained to output an appropriate vector expression for each document instead of, or in addition to, outputting a semantic similarity.

Figure 4:
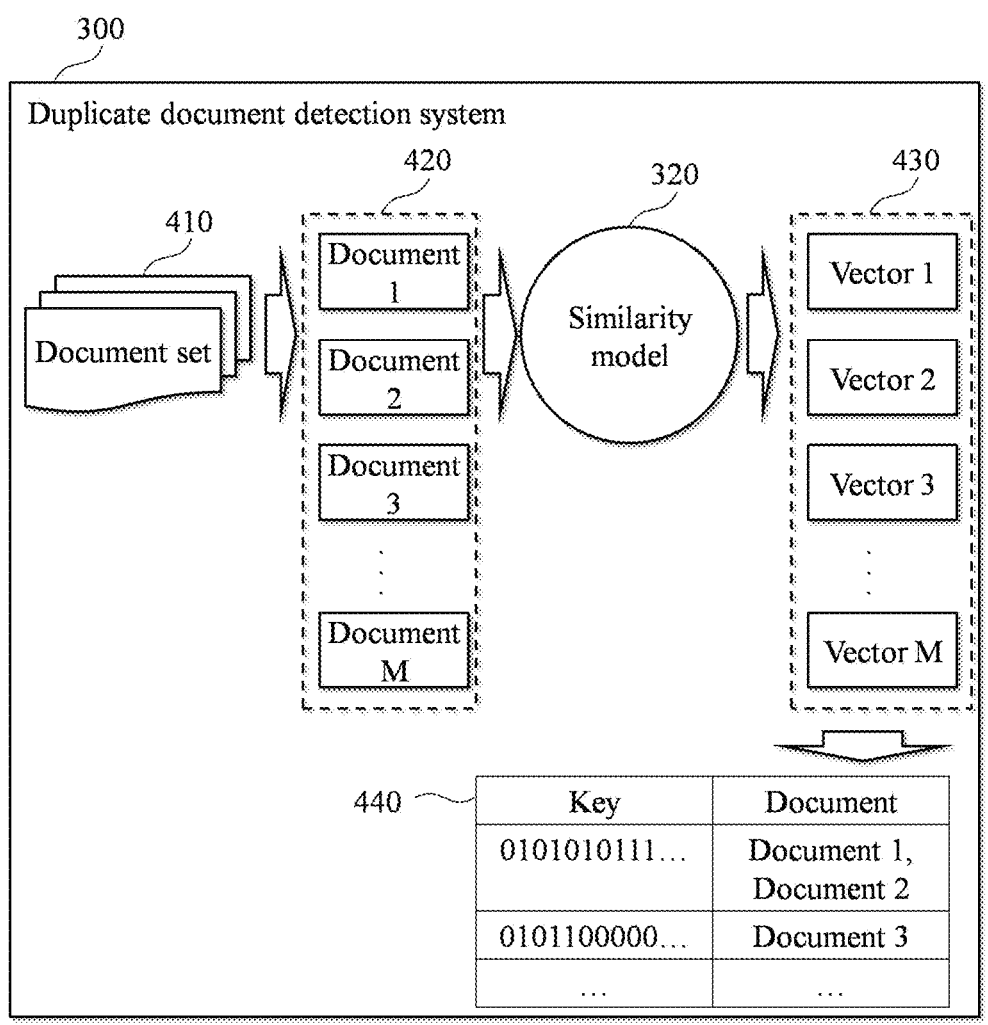
FIG. 4 illustrates an example of a duplicate document detection method according to at least one example embodiment.

FIG. 4 illustrates an example of a duplicate document detection process according to at least one example embodiment. The duplicate document detection system 300 may be implemented by the aforementioned computer apparatus 200 and may process the following duplicate document detection process under control of the processor 220 included in the computer apparatus 200.

Great computational cost may be incurred to determine a similarity between a new document and documents of all of other authors every time an author creates a single document. To outperform the above issue, the duplicate document detection system 300 of FIG. 3 may detect a duplicate document in the following manner.

The duplicate document detection system 300 may train the similarity model 320 to receive documents 420 included in a document set 410 and to output a vector expression corresponding to each of the documents 420. That is, the similarity model 320 may be trained to output a vector expression by representing the documents 420 to real vectors 430 in N dimension, respectively, during a learning process for calculating a similarity between the documents 420. The similarity model 320 outputs a vector based on a meaning of content included in the corresponding document 420. Therefore, if the documents 420 have partially different, but semantically similar content, the similarity model 320 may acquire a similar vector expression.

Also, the duplicate document detection system 300 may generate a binary character string by performing a vector quantization on an M dimensional real vector acquired from the similarity model 320. The generated binary character string may be used as a key of a corresponding document and documents having duplicate keys may be detected as duplicate documents. For example, referring to a table 440, a key and documents corresponding to the key are stored in association with each other. In the table 440, document 1 and document 2 associated with the same key, or a similar key, may be regarded as duplicate documents.

Figure 5:
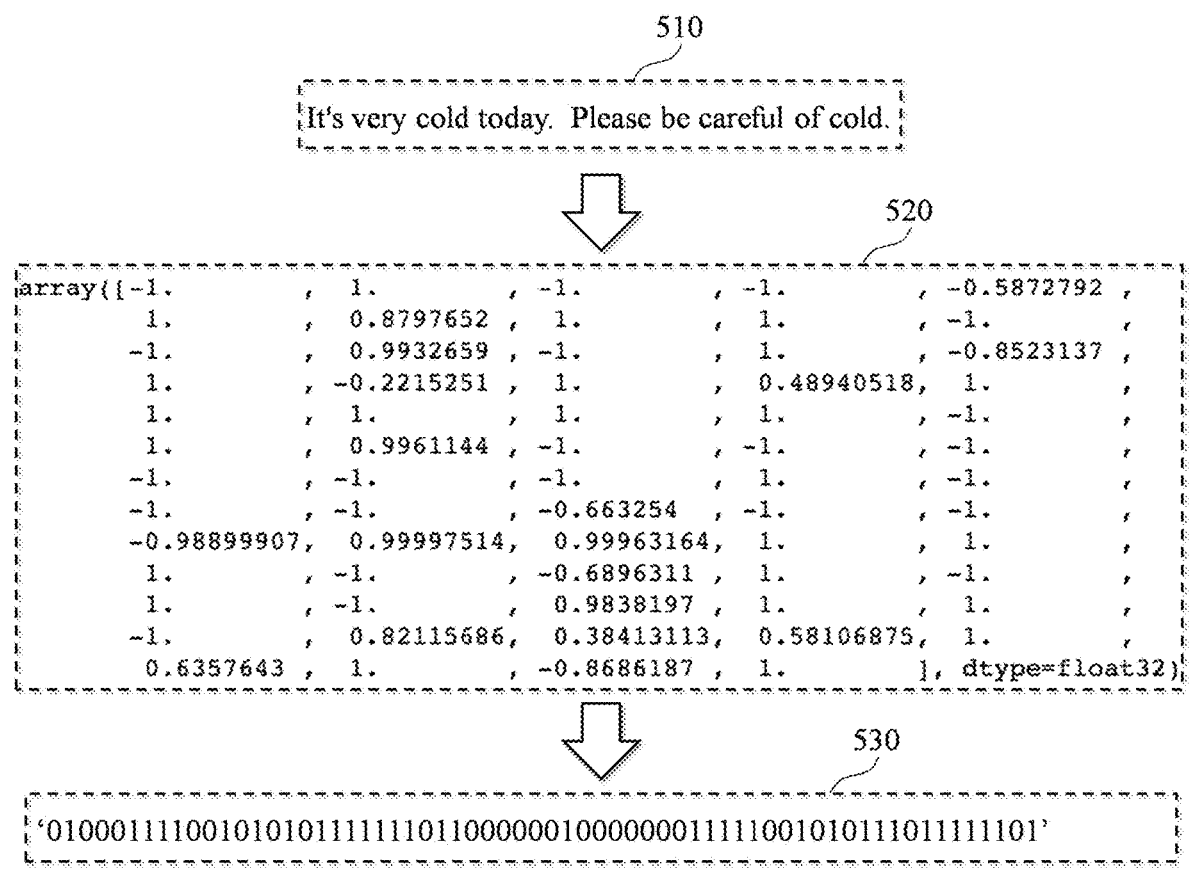
FIG. 5 illustrates an example of a vector quantization according to at least one example embodiment.

FIG. 5 illustrates an example of a vector quantization according to at least one example embodiment. Referring to FIG. 5, a first box 510 indicated with dotted lines represents an example of text content of a document (e.g., a candidate document). Here, for example, the similarity model 320 receives the candidate document and outputs an M (M=64) dimensional real vector as illustrated in a second box 520 indicated with dotted lines. Here, a third box 530 indicated with dotted lines represents an example in which a vector quantization on the M dimensional real vector is performed to be (e.g., to obtain) a binary character string. For example, the duplicate document detection system 300 may generate a binary vector through a vector quantization of replacing a value of a corresponding component with '1' if a value of each component of the M dimensional real vector is 0 or positive, and replacing a value of a corresponding component with '0' if the value of each component is negative. Here, a byte sequence that includes components of a binary vector in a row may be a key of a corresponding document. In this case, all of the documents having the same key value, or a similar key value, may be regarded as being a duplicate.

To improve the performance of vector quantization, a loss function for the similarity model 320 may be adjusted. For example, the loss function may be expanded from the following Equation 1 to Equation 2.

Loss=MSE(exp(-||v1-v2||,y)   [Equation 1]

Loss=MSE(exp(-alpha||v1-v2||,y)   [Equation 2]

The loss function refers to a function for an error between a value output from a neural network and a real value (e.g., a correct value), and may represent vector expressions of two documents, v1 and v2. In Equation 1 and Equation 2, exp(-||v1-v2||) denotes a similarity calculated by the similarity model 320, y denotes a correct answer similarity (e.g., the calculated semantic similarity as discussed in association with FIG. 3), and MSE represents a mean squared error. Further, alpha ($\alpha$) refers to a real number included in the range of 0 to 1. The duplicate document detection system 300 may adjust the average distance between vector expressions of documents through adjustment of $\alpha$ in the loss function of the similarity model 320. Here, as a value of $\alpha$ becomes closer to 0, the average distance between vector expressions for documents may become farther, that is, increase. According to at least one example embodiment, with reference to the discussion of FIG. 3, the duplicate document detection system 300 may train the similarity model 320 by inputting each respective candidate document pair among the similar document pair set 330, and the dissimilar document pair set 340, to the similarity model 320. The similarity model 320 may acquire (e.g., generate, output, etc.) a vector expression for each candidate document in the respective candidate document pair representative of the mathematical and/or semantic meaning of the candidate document. In particular, the similarity model 320 may acquire (e.g., generate, output, etc.) a vector expression for each candidate document such that (1) a similarity between the vector expressions acquired for the respective candidate document pair, and (2) a calculated (e.g., correct) semantic similarity for the respective candidate document pair minimize, or reduce, a loss with respect to the loss function in Equation 1 and/or Equation 2. For example, the vector expressions acquired for the respective candidate document pair and the calculated semantic similarity may be inputs to the loss function. Based on this training, the trained similarity model may output similar vector expressions for input documents having a high semantic similarity.

Figure 6:
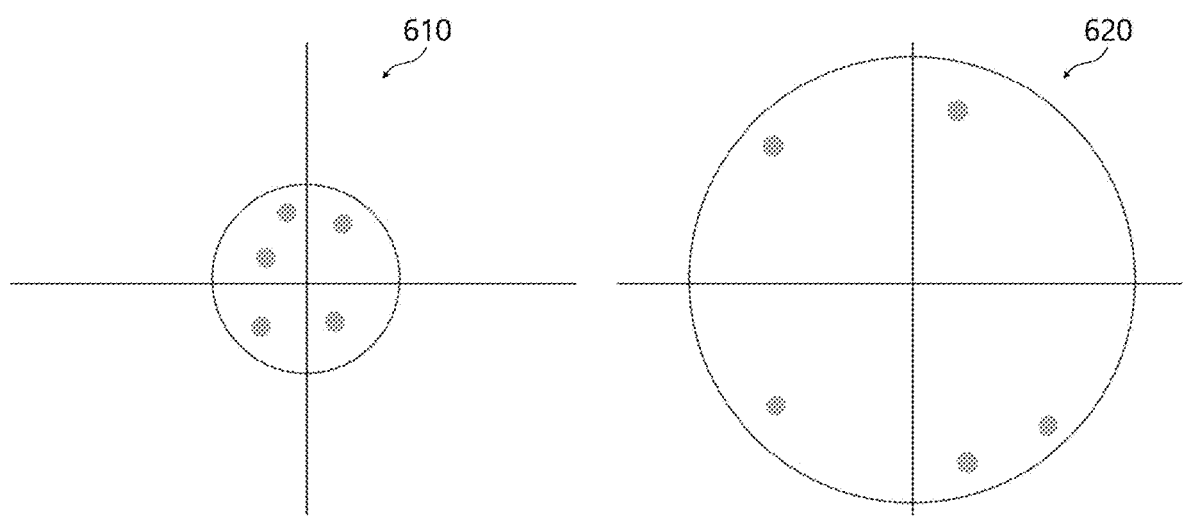
FIG. 6 illustrates an example of adjusting a loss function according to at least one example embodiment.

FIG. 6 illustrates an example of adjusting a loss function according to at least one example embodiment. Referring to FIG. 6, as the duplicate document detection system 300 decreases a value of $\alpha$ in the loss function of the similarity model 320, the average distance between vector expressions becomes relatively farther, that is, increases. In FIG. 6, a distance between points of a first graph 610 becomes farther like a distance between points of a second graph 620. Here, $\alpha$ may be used to allow the same key, or a similar key, between documents having a high actual similarity by performing partitioning through a vector quantization in a state in which vector expressions about documents are sufficiently spread. In FIG. 6, the distance between points on the 2D plane is described, but similarly, the distance between vector expressions in the n-dimension can be easily understood.

Figure 7:
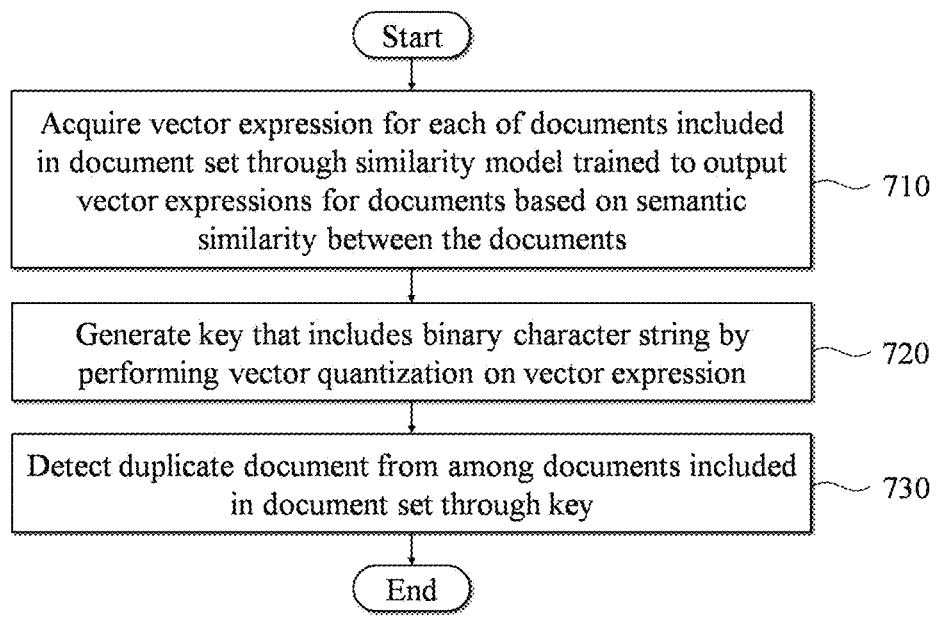
FIG. 7 is a flowchart illustrating an example of a duplicate document detection method according to at least one example embodiment.

FIG. 7 is a flowchart illustrating an example of a duplicate document detection method according to at least one example embodiment. The duplicate document detection method according to at least one example embodiment may be performed by the computer apparatus 200 that implements the aforementioned duplicate document detection system 300. In this case, the processor 220 of the computer apparatus 200 may be configured to execute a control instruction according to a code of at least one computer program, and/or a code of an OS, included in the memory 210. Here, the processor 220 may control the computer apparatus 200 to perform operations 710 to 730 included in the duplicate document detection method of FIG. 7 in response to a control instruction provided from a code stored in the computer apparatus 200.

Referring to FIG. 7, in operation 710, the computer apparatus 200 may acquire a vector expression for each of documents included in a document set through (e.g., using) a similarity model trained to output vector expressions for documents based on a semantic similarity between the documents. For example, the similarity model may be trained to output a vector expression for a document based on a meaning (e.g., a mathematical and/or semantic meaning) of an input document. That is, the similarity model may be trained to output similar vector expressions for documents having a relatively great semantic similarity. Here, the vector expression may be in a form of an N dimensional real vector. Here, N denotes a natural number of 2 or more.

In the case of generating the vector expression, the computer apparatus 200 may generate the vector expression (e.g., may train the similarity model to output the vector expression) using a loss function of the similarity model adjusted based on a weight assigned with respect to a difference between an output value of the similarity model and a real value (e.g., a correct value). A value of the weight may correspond to a of Equation 2. Here, the computer apparatus 200 may adjust an average distance between vector expressions by adjusting the value of the weight, a, as described above with reference to FIG. 6.

In detail, for example, the computer apparatus 200 may extract, from a document database, a similar document pair set that includes a plurality of similar document pairs having the same attribute, or a similar attributes, (e.g., an attribute common to the pair and/or set of documents that has the same or similar values in the pair and/or set of documents) and a dissimilar document pair set that includes a plurality of randomly extracted dissimilar document pairs. For example, the document database may correspond to the document DB 310 of FIG. 3, and the similar document pair set and the dissimilar document pair set may correspond to the similar document pair set 330 and the dissimilar document pair set 340 of FIG. 3, respectively. Here, the attribute (s) may include at least one of an author of a document, a post section of the document, and/or a registration time range of the document. For example, when the author is defined as the attribute, two different documents of the same author, or similar authors, may be recognized as documents having the same attribute or similar attributes. As another example, when an author, a post section, and a 1-hour range are defined as attributes, two documents registered on the same post section, or similar post sections, by the same author, or similar authors, within one hour may be recognized as documents of the same attributes or similar attributes. Although a dissimilar document pair may include two randomly extracted documents, document pairs having the same attribute, or similar attributes, among the randomly extracted document pairs may be excluded or removed from the dissimilar document pair (e.g., from dissimilar document pair and/or the dissimilar document pair set 340).

Also, the computer apparatus 200 may calculate a mathematical similarity using a mathematical measure for each of the plurality of similar document pairs and each of the plurality of dissimilar document pairs. For example, the computer apparatus 200 may calculate the mathematical similarity using at least one of a cosine similarity, a Euclidean distance, and/or a Jaccard similarity as the mathematical measure.

Also, the computer apparatus 200 may calculate a semantic similarity for each of the plurality of similar document pairs and each of the plurality of dissimilar document pairs by increasing the mathematical similarity calculated for each of the plurality of similar document pairs and by decreasing the mathematical similarity for each of the plurality of dissimilar document pairs. For example, the computer apparatus 200 may increase the mathematical similarity calculated for each of the plurality of similar document pairs through input to a first nonlinear function and may decrease the mathematical similarity calculated for each of the plurality of dissimilar document pairs through input to a second nonlinear function. In this case, the first nonlinear function and the second nonlinear function may be two nonlinear functions that meet a condition in which the first nonlinear function calculates a value greater than that of the second nonlinear function with respect to all of the same input values or all similar input values. As described above, the mathematical similarity for the similar document pair may be underestimated by the mathematical measure and the mathematical similarity for the dissimilar document pair may be overestimated by the mathematical measure. The computer apparatus 200 may calculate the semantic similarity by increasing the underestimated mathematical similarity and by decreasing the overestimated mathematical similarity. An increase level or a decrease level of the mathematical similarity may be determined based on a nonlinear function selected between the first nonlinear function and the second nonlinear function. According to at least one example embodiment, each of the first nonlinear function and/or the second nonlinear function may be designed, determined and/or selected through empirical study. According to at least one example embodiment, each of the increase level of the first nonlinear function and/or the decrease level of the second nonlinear function may be design parameters determined through empirical study.

Also, the computer apparatus 200 may train a similarity model based on the plurality of similar document pairs, the plurality of dissimilar document pairs, and the semantic similarity. As described above, the computer apparatus 200 may sequentially input each of the plurality of similar document pairs and each of the plurality of dissimilar document pairs to the similarity model, and may train the similarity model so that the similarity model determines an output value that makes the MSE between the output value and the correct answer score predetermined for the document pair the smallest. That is, the similarity model may be trained to minimize or lower a loss by inputting an output value of the similarity model and a corresponding semantic similarity to a loss function as a correct answer score. Consider a situation in which user A is requested to register document a. In this case, the computer device 200 may generate m document pairs for each of the document a and the m documents input in the past. The generated m document pairs may be sequentially input to the learned similarity model, and the learned similarity model may output the similarity for each of the m document pairs. In this case, when there are k or more document pairs having a similarity greater than or equal to a threshold value, the computer device 200 may expose CAPTCHA to a user who inputs a document or block registration of the document.

In operation 720, the computer apparatus 200 may generate a key that includes a binary character string by performing a vector quantization on the vector expression. For example, the computer apparatus 200 may generate the binary character string as the key by replacing a value of $\alpha$ corresponding component with 1 if a value of each component of the vector expression is 0 or more and replacing a value of $\alpha$ corresponding component with 0 if the value is negative, and by performing the vector quantization on the vector expression.

In operation 730, the computer apparatus 200 may detect a duplicate document from among the documents included in the document set through (e.g., using) the key. When a key is generated for each of the documents included in the document set, the computer apparatus 200 may store a key and a corresponding document in association with each other. In this case, documents having the same key, or similar keys, may be stored in association with a single same or similar key. Therefore, if a plurality of documents are stored in association with a single key, the computer apparatus 200 may detect the plurality of documents as duplicate documents. That is, the computer apparatus 200 may detect documents having the same key, or similar keys, as duplicate documents.

In the related art using an encryption algorithm, such as message-digest algorithm 5 (MD5), two documents may be allowed to have the same key value (hash value) only when the documents have the exactly same content. Therefore, although the two documents have partially different content, but are semantically similar for the most remaining content, a duplicate document may be not be detected. The duplicate document detection method according to at least one example embodiment may perform a vector quantization on a vector expression that is output based on meanings of documents through a similarity model and may use the vector expression as a key, instead of using a hash value about content of a document. Therefore, although the documents have partially different content, a key may be generated such that semantically similar documents may have the same key or a similar key. In the actual experiment, the duplicate document detection method according to at least one example embodiment detected an average of 20 times or more duplicate comments compared to MD5 and also achieved an accuracy of 99% or more.

As described above, according to at least one example embodiment, it is possible to quickly determine whether a duplicate part is present between documents based on a vector quantization. Also, instead of training a model to directly perform clustering, the model is trained to acquire a vector expression for each document through a similarity learning for document pairs and then acquire a hash value for each of the documents through a vector quantization. Therefore, it is possible to conserve computational costs. Also, since it is possible to acquire the same key value, or a similar key value, for similar documents in a wider range than an encryption algorithm, such as MD5, whether a duplicate part is present may be determined even with respect to documents having partially different content.

Conventional devices and methods for detecting duplicate documents employ clustering algorithms or hash algorithms. Processing of the clustering algorithms results in excessive resource consumption (e.g., processor, memory, power, delay, etc.), particularly when applied to a large number of documents. Also, the hash algorithms are only able to detect an exact match between documents and, thus, result in excessive undetected duplicate documents having a similar semantic meaning without being an exact match.

However, according to at least one example embodiment, improved devices and methods are provided for detecting duplicate documents by comparing binary character strings generated based on vector expressions output from a similarity model. Accordingly the improved devices and methods overcome the deficiencies of the conventional devices and methods employing clustering algorithms by reducing resource consumption (e.g., processor, memory, power, delay, etc.). Also, the similarity model of the improved devices and methods is trained to output similar vector expressions based on receiving semantically similar documents (e.g., according to an adjustable weight). Accordingly, the improved devices and methods overcome the deficiencies of the conventional devices and methods employing hash algorithms by detecting duplicate documents having a similar semantic meaning without being an exact match.

According to at least one example embodiment, operations described herein as being performed by the computer apparatus 200, the processor 220 and/or the duplicate document detection system 300 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

While this disclosure includes at least one example embodiment, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A duplicate document detection method of a computer apparatus including processing circuitry, the method comprising:
    inputting, by the processing circuitry, a plurality of documents into a trained similarity model to obtain a respective vector expression for each of the plurality of documents, the trained similarity model being trained using a plurality of reference document pairs according to a training process, the plurality of reference document pairs including a similar document pair set and a dissimilar document pair set, the similar document pair set including a plurality of similar document pairs having a common attribute, the dissimilar document pair set including a plurality of dissimilar document pairs having different attributes or being randomly paired, and the training process including
        calculating a mathematical similarity for each of the plurality of similar document pairs and each of the plurality of dissimilar document pairs using a mathematical measure to obtain a first plurality of mathematical similarities based on the plurality of similar document pairs and a second plurality of mathematical similarities based on the plurality of dissimilar document pairs,
        calculating a respective semantic similarity of each of the plurality of similar document pairs by increasing the first plurality of mathematical similarities to obtain a first plurality of semantic similarities,
        calculating a respective semantic similarity of each of the plurality of dissimilar document pairs by decreasing the second plurality of mathematical similarities to obtain a second plurality of semantic similarities, and
        training a similarity model based on the plurality of similar document pairs, the plurality of dissimilar document pairs, the first plurality of semantic similarities and the second plurality of semantic similarities to obtain the trained similarity model;
    generating a key by performing a vector quantization on the respective vector expression, the key including a binary character string; and
    detecting a duplicate document from among the plurality of documents using the key.

2. The method of claim 1, wherein the respective vector expression is an N dimensional real vector, N denoting a natural number of 2 or more.

3. The method of claim 1, wherein the generating the key comprises generating the binary character string by:
    replacing a value in the respective vector expression of 0 or more with 1, or
    replacing a negative value in the respective vector expression with 0.

4. The method of claim 1, wherein the detecting the duplicate document comprises detecting two among the plurality of documents associated with the key.

5. The method of claim 1, further comprising:
    training the similarity model using a loss function adjusted based on a weight, the weight corresponding to a difference between an output value of the similarity model and a calculated value.

6. The method of claim 5, further comprising:
    adjusting an average distance between a plurality of vector expressions by adjusting a value of the weight, the plurality of vector expressions including the respective vector expression.

7. The method of claim 1, further comprising:
    extracting, by the processing circuitry, the plurality of reference document pairs from a document database; and
    training, by the processing circuitry, the similarity model according to the training process.

8. The method of claim 1, wherein the common attribute comprises at least one of an author of a document, a post section of the document, or a registration time range of the document.

9. The method of claim 1, wherein
    the calculating the respective semantic similarity of each of the plurality of similar document pairs includes calculating the first plurality of semantic similarities by inputting the first plurality of mathematical similarities to a first nonlinear function;
    the calculating a respective semantic similarity of each of the plurality of dissimilar document pairs includes calculating the second plurality of semantic similarities by inputting the second plurality of mathematical similarities to a second nonlinear function; and
    the first nonlinear function outputs a value greater than a value output by the second nonlinear function based on any value input to both the first nonlinear function and the second nonlinear function.

10. A non-transitory computer-readable record medium storing instructions that, when executed by processing circuitry, cause the processing circuitry to perform the method of claim 1.

11. The method of claim 1, further comprising:
    displaying a Completely Automated Public Turing test to tell Computers and Humans Apart (CAPTCHA) in response to the detecting; and
    blocking registration of the duplicate document in response to the detecting.

12. The method of claim 5, wherein the training includes inputting vector expressions for a candidate document pair and a calculated semantic similarity for the candidate document pair into the loss function.

13. The method of claim 1, wherein the detecting the duplicate document comprises:
comparing the key to a plurality of other keys stored in association with the plurality of documents in a table; and
detecting a particular document associated with the respective vector expression to be the duplicate document based on determining the key to be the same as one of the plurality of other keys.

14. The method of claim 1, wherein the plurality of dissimilar documents pairs are randomly paired.

15. The method of claim 9, wherein the plurality of dissimilar documents pairs are randomly paired.

16. A computer apparatus comprising:
processing circuitry configured to cause the computer apparatus to
input a plurality of documents into a trained similarity model to obtain a respective vector expression for each of the plurality of documents, the trained similarity model being trained using a plurality of reference document pairs according to a training process, the plurality of reference document pairs including a similar document pair set and a dissimilar document pair set, the similar document pair set including a plurality of similar document pairs having a common attribute, the dissimilar document pair set including a plurality of dissimilar document pairs having different attributes or being randomly paired, and the training process including
calculating a mathematical similarity for each of the plurality of similar document pairs and each of the plurality of dissimilar document pairs using a mathematical measure to obtain a first plurality of mathematical similarities based on the plurality of similar document pairs and a second plurality of mathematical similarities based on the plurality of dissimilar document pairs,
calculating a respective semantic similarity of each of the plurality of similarity document pairs by increasing the first plurality of mathematical similarities to obtain a first plurality of semantic similarities,
calculating a respective semantic similarity of each of the plurality of dissimilar document pairs by decreasing the second plurality of mathematical similarities to obtain a second plurality of semantic similarities, and
training a similarity model based on the plurality of similar document pairs, the plurality of dissimilar document pairs, the first plurality of semantic similarities and the second plurality of semantic similarities to obtain the trained similarity model,
generate a key by performing a vector quantization on the respective vector expression, the key including a binary character string, and
detect a duplicate document from among the plurality of documents using the key.

17. The computer apparatus of claim 16, wherein the respective vector expression is an N dimensional real vector, N denoting a natural number of 2 or more.

18. The computer apparatus of claim 16, wherein the processing circuitry is configured to cause the computer apparatus to generate the binary character string by:
replacing a value in the respective vector expression of 0 or more with 1; or
replacing a negative value in the respective vector expression with 0.

19. The computer apparatus of claim 16, wherein the processing circuitry is configured to cause the computer apparatus to detect the duplicate document by detecting two among the plurality of documents associated with the key.

20. The computer apparatus of claim 16, wherein the processing circuitry is configured to cause the computer apparatus to:
train the similarity model using a loss function adjusted based on a weight, the weight corresponding to a difference between an output value of the similarity model and a calculated value.

21. The computer apparatus of claim 20, wherein the processing circuitry is configured to cause the computer apparatus to:
adjust an average distance between a plurality of vector expressions by adjusting a value of the weight, the plurality of vector expressions including the respective vector expression.

22. The computer apparatus of claim 16, wherein the processing circuitry is configured to cause the computer apparatus to:
display a Completely Automated Public Turing test to tell Computers and Humans Apart (CAPTCHA) in response to detecting the duplicate document; and
block registration of the duplicate document in response to detecting the duplicate document.

23. The computer apparatus of claim 20, wherein the processing circuitry is configured to cause the computer apparatus to:
train the similarity model including inputting vector expressions for a candidate document pair and a calculated semantic similarity for the candidate document pair into the loss function.

* * * * *